United States Patent [19]

Morinaka

[11] 4,129,869
[45] Dec. 12, 1978

[54] AUTOMATICAL SIGNALLING APPARATUS
[75] Inventor: Akiyoshi Morinaka, Amagasaki, Japan
[73] Assignee: Mitsubishi Denki Kabushiki Kaisha, Tokyo, Japan
[21] Appl. No.: 763,235
[22] Filed: Jan. 27, 1977
[51] Int. Cl.² ............................................. G01S 9/56
[52] U.S. Cl. ................................. 343/6.8 R; 325/116
[58] Field of Search ......... 343/6.5 R, 6.5 LC, 6.5 SS, 343/6.8 R, 6.8 LC; 325/116

[56] References Cited
U.S. PATENT DOCUMENTS

| 2,800,651 | 7/1957 | Marshall | 343/6.5 R |
| 2,907,999 | 10/1959 | Wadley | 343/6.8 R X |
| 3,047,857 | 7/1962 | Rockett et al. | 343/6.5 R |
| 3,391,404 | 7/1968 | Vogelman | 343/6.8 R X |
| 3,546,695 | 12/1970 | Freedman | 343/6.8 R X |
| 3,931,622 | 1/1976 | Freedman | 343/6.5 R |
| 3,967,202 | 6/1976 | Batz | 343/6.8 R X |

OTHER PUBLICATIONS
Radio Amateur's Handbook, 50th Edition, 1973, AU 222, p. 82.

Primary Examiner—S. C. Buczinski
Attorney, Agent, or Firm—Oblon, Fisher, Spivak, McClelland & Maier

[57] ABSTRACT

An apparatus for receiving a repetitive radar pulse wave signal, generating an ON-OFF signal upon reception of the radar pulse wave signal, and applying the ON-OFF signal to a speaker or a display lamp to indicate the reception of the radar pulse wave.

4 Claims, 4 Drawing Figures

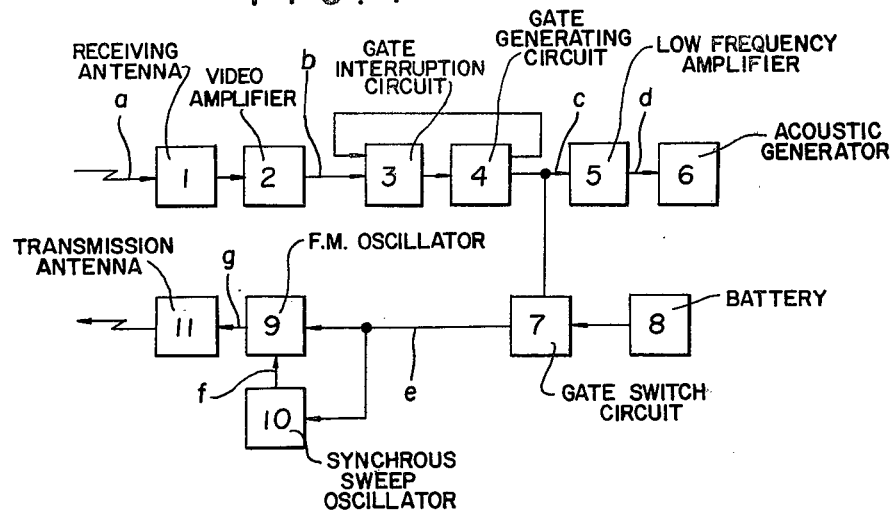
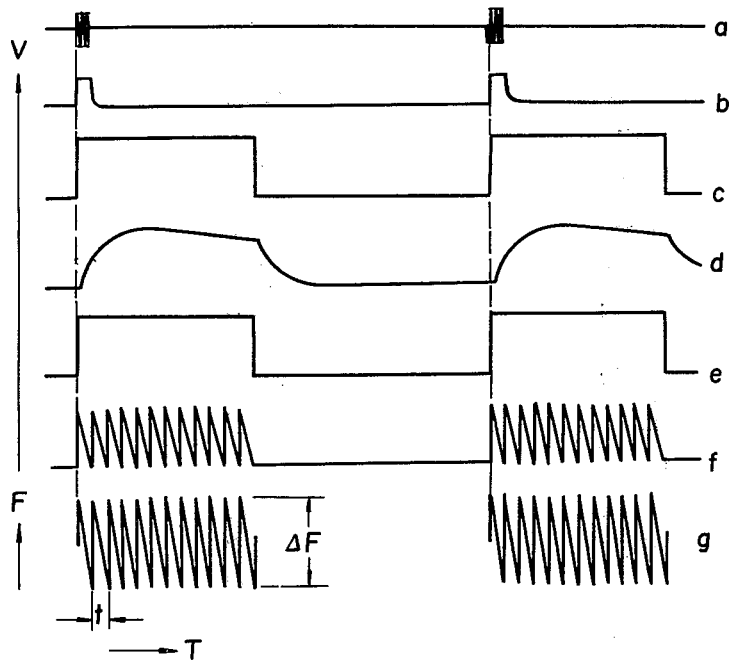

AUTOMATICAL SIGNALLING APPARATUS

BACKGROUND OF THE INVENTION

1. Field of the Invention

The present invention relates to an automatic signalling apparatus provided with a life boat or a life jacket.

2. Description of the Prior Art

In general, in the event of a shipwreck, the surviors escape the shipwreck by means of a lifeboat, which because of its small size and the vastness of the oceans is difficult for a rescue boat to find. Often the life boat is equipped only with optical or acoustical signalling devices, such as a signal flare with or without a parachute, a sun signalling mirror, a light, a whistle, etc. The use of these devices is left within the discretion of the crew, depending of course upon weather and sea conditions at the time of shipwreck.

Recently, in order to improve this problem, a rescue signalling apparatus using a radio signal has been proposed. This signalling apparatus employs FM sweep oscillations in the frequency band of a marine radar and functions as a repeater apparatus for automatically initiating a corresponding rescue signal upon receiving the pulse wave of the marine radar. However, the distressed persons could not note whether or not the rescue activity has been started.

SUMMARY OF THE INVENTION

Accordingly, one object of the present invention is to provide a novel automatic signalling apparatus for easily and rapidly commencing a rescue in the event of shipwreck, etc.

Another object of the present invention is to provide an automatic signalling apparatus which is equipped with an acoustic generating device or a display lamp for informing the distressed persons of the fact that the rescue activity has commenced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram of one embodiment of an automatic signalling apparatus according to the present invention;

FIG. 2 is a representation of signal waveforms at various points within the apparatus of FIG. 1;

DETAILED DESCRIPTION OF THE PREFERRED EMBODIMENTS

Figure 3:
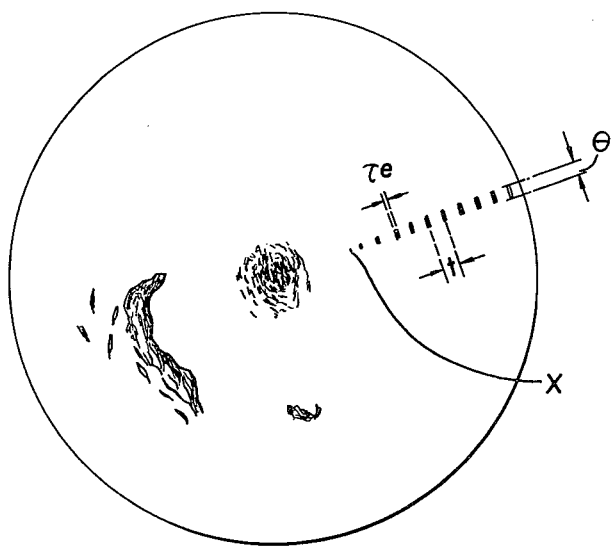
FIG. 3 is a PPI image pattern for showing an image on a radar plane position indicator (PPI)

Referring now to the drawings, wherein like reference numerals designate identical or corresponding parts throughout the several views, and more particularly to FIG. 1 thereof, the reference (1) designates a receiving antenna for receiving a radar pulse wave $a$; (2) designates a video amplifier for amplifying video pulses detected by a detector (not shown) which directly detects the radar pulse wave and which is equipped with the video amplifier (2); (3) designates an AND (or NAND) gate for feedback interruption of the receiving system during a transmitting period. The gate generating circuit (4) is actuated by the output of the video amplifier (2) seen as the trigger in FIG. 2b. The output of the gate generating circuit (4) is pulses having the waveform of FIG. 2c. The reference (5) designates a low frequency amplifier for amplifying the gate output signal seen in FIG. 2c, and has the output waveform shown in FIG. 2d. The reference (6) designates an acoustic generator such as a water-proof speaker; (7) designates a semiconductor gate switch circuit which passes the current from the battery (8) according to the waveform of FIG. 2e during the time the gate output FIG. 2c is applied. The reference (9) designates a direct F.M. oscillator equipped with a cavity resonator which can sweep-oscillate over a frequency band which includes the receiver bandwidth of the marine radar. The oscillator (9) contains a unit for frequency sweep modulation such as variable capacitance diode. The reference (10) designates a synchronous sweep oscillator driven by the gate voltage FIG. 2e. The linear output voltage FIG. 2f of the oscillator (10) is applied to the variable capacitance diode etc. The reference (11) designates an antenna for transmission. The responder wave is radiated as the frequency sweep wave synchronized to the radar pulse wave and is linearly frequency modulated as shown in FIG. 2g.

As clearly understood from the above description, when the radar pulse wave FIG. 2a is received with a level high enough to drive the AND gate circuit (3), the gate generating circuit (4) is repetitively actuated at the repeat frequency of the radar pulse wave, whereby the rescue signal wave FIG. 2g having the same repeat frequency is radiated for the time corresponding to the output signal of FIG. 2c. At the same time, the acoustic generator (6) (speaker) indicates reception of the rescue signal by emitting a sound having a frequency equal to the repeat frequency of the radar pulse wave (repeating the sound as a beep-beep at each time of directional transmission from the radar antenna). Usually, the repetition frequency of the radar pulse wave of the marine radar is in a range of the audible frequency bands (500 Hz to 3600 Hz) and the sound produced thereby is audible.

When the rescue ship approaches, the period of time during which the received radar signal is detected is increased by the side lobe of the radar antenna. As a result, the repeating sound at the acoustic generator 6 is present for a longer time period, and the approach of the rescue ship can be noted.

When a plurality of the rescue ships approach, the received radar pulse waves of the rescue ships can be discriminated either by noting the difference in pulse repetition frequencies of the rescue ship radars or the difference in the radar antenna rotating rates.

FIG. 2g shows the relationships of the sweep frequency range $\Delta F$, the sweep frequency $t$, and the time T during which the responder signal is radiated upon each reception of a radar pulse wave. The equivalent pulse width $\tau e$ of the pulse wave detected by the receiving unit of the marine radar having the band width B for passing the transmitted signal of the object radar is given by the equation $$\tau e = (B \cdot t)/\Delta F$$

As the result, the image of FIG. 3 is provided as the rescue signal on the radar PPI of the rescue ship.

In FIG. 3, the reference X designates the position of the distressed person and θ designates the beam width of the radar antenna to show the direction to the distressed person (life boat or life jacket).

Figure 4:
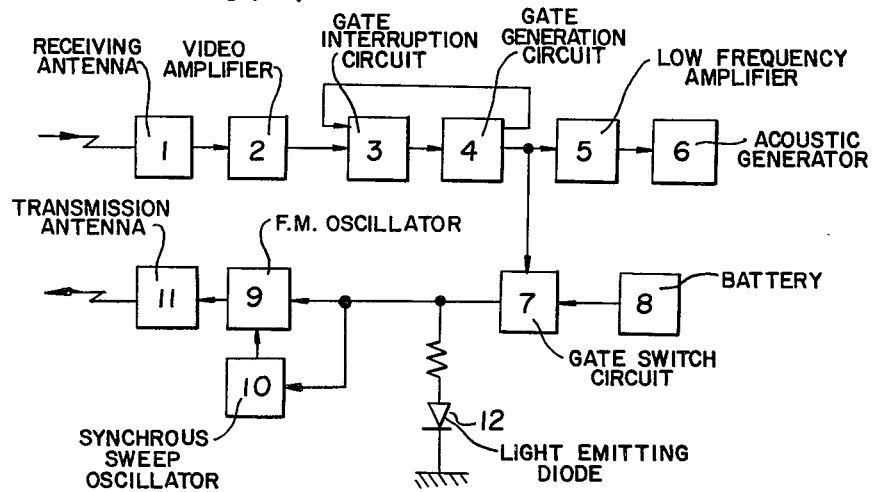
FIG. 4 is a block diagram of another embodiment of the automatic signalling apparatus according to the invention.

Each of the units shown in FIG. 1, except the acoustic generator (speaker) (6) are assembled in a case. Accordingly, the acoustic generator (6) is thereby disadvantageously separately handled. When the weather conditions at sea are not good, the acoustic generator (6) is useless because of the noises from wind, rain, billow, etc. In order to overcome this disadvantage, the optical display is proposed in FIG. 4 of the embodiment of the present invention. A display lamp is formed by a small lightweight element of a light emitting diode (12) which can be assembled either in the case or in the acoustic generator (6) (if both sound and light signalling are used). The light emission diode (12) can be selected from the known ones. Regardless of the weather conditions at sea, the display lamp signalling apparatus can be effectively used even at night. The approach of the rescue ship and the number of the rescue ships approaching can be likewise determined as with the acoustic generator.

As stated above, in accordance with the automatic signalling apparatus of the invention, a desired radar wave is automatically generated and the acoustic generator is actuated when a ship operating a search radar approaches. Accordingly, when the apparatus is equipped on a life boat, the fact of an approaching rescue ship is conveyed to the distressed person's to encourage them. Moreover, the signal flare with or without a parachute equipped in the life boat can be timingly used in conjunction with the actuation of the acoustic generator or the display lamp. Accordingly, the rescue activity can be remarkably improved at both the distressed person's side and the rescue ship's side.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In an automatic rescue signalling apparatus for generating and transmitting a return signal upon the reception of a radar pulse wave from a rescue ship, the improvement comprising:
   gate signal generation means for converting said received radar pulse wave into an ON-OFF gate signal at the repeat frequency of the radar pulse wave;
   gating means coupled to said gate signal generation means for interrupting the input to said gate signal generation means during the generation of said ON-OFF gate signal;
   acoustic generator means coupled to said gate signal generation means for converting said amplified ON-OFF signal into repeating audible sound having a frequency equal to the repeat frequency of the received radar pulse wave and a time period which is increased by the side lobe of the rescue ship radar antenna whereby received radar pulse waves of a plurality of rescue ships can be discriminated either by noting the difference in pulse repetition frequencies of the rescue ship radars or the difference in the rescue ship radar antenna rotating rates, and the approach of a rescue ship can be noted when the repeating sound is present for increasing time periods;
   distress signalling means coupled to said gate signal generation means for generating and transmitting a synchronous frequency sweeping FM radio frequency return signal during the generation of said ON-OFF gate signal, said distress signalling means comprising a synchronous sweep oscillator;
   whereby said audible sound produced by said acoustic generator means alerts of the approach of a marine search party.

2. In an automatic signalling apparatus according to claim 1, the improvement of said visual lamp display means comprising:
   a light emission diode.

3. In an automatic signalling apparatus according to claim 1, the improvement of said gate signal generation means comprising:
   a gate circuit for generating a switching signal indicative of a detected radar pulse wave;
   semiconductor switching means actuated by said switching signal for passing a current through said semiconductor switching means to said distress signalling means; and
   battery means coupled to said semiconductor switching means for producing said current passed by said semiconductor switching means;
   whereby said current passed through said semiconductor switching means to said distress signalling means initiates said generating and transmitting of said linear frequency sweeping FM signal.

4. In an automatic rescue signalling apparatus for generating and transmitting a return signal upon the reception of a radar pulse wave from a rescue ship, the improvement comprising:
   gate signal generation means for converting said received radar pulse wave into an ON-OFF gate signal at the repeat frequency of the radar pulse wave;
   gating means coupled to said gate signal generation means for interrupting the input to said gate signal generation means during the generation of said ON-OFF gate signal;
   visual lamp display means coupled to said gate signal generation means for directly converting said ON-OFF gate signal into a repeating visible light signal having a frequency equal to the repeat frequency of the received radar pulse wave and a time period which is increased by the side lobe of the rescue ship radar antenna whereby received radar pulse waves of a plurality of rescue ships can be discriminated either by noting the difference in pulse repetition frequencies of the rescue ship radars or the difference in the rescue ship radar antenna rotating rates, and the approach of a rescue ship can be noted when the repeating sound is present for increasing time periods;
   distress signalling means coupled to said gate signal generation means for generating and transmitting a linear, synchronous, frequency sweeping FM radio frequency return signal during the generation of said ON-OFF gate signal, said distress signalling means comprising a synchronous sweep oscillator and a variable capacitance diode;
   whereby said visible light signal produced by said visual lamp display means alerts a rescued party to the approach of a marine search party.

* * * * *